United States Patent [19]
Shimokoriyama et al.

[11] Patent Number: 5,874,996
[45] Date of Patent: Feb. 23, 1999

[54] MOVEMENT DETECTION DEVICE AND ENCODING APPARATUS USING THE SAME

[75] Inventors: Makoto Shimokoriyama, Kawasaki; Izumi Matsui, Tokyo; Akiyoshi Hamanaka, Tokyo; Yukinori Yamamoto, Tokyo, all of Japan

[73] Assignee: Canon Kabushiki Kaisha, Tokyo, Japan

[21] Appl. No.: 968,724

[22] Filed: Nov. 12, 1997

Related U.S. Application Data

[60] Continuation of Ser. No. 779,447, Jan. 7, 1997, abandoned, which is a division of Ser. No. 217,281, Mar. 24, 1994, Pat. No. 5,617,143.

[30] Foreign Application Priority Data

| Mar. 29, 1993 | [JP] | Japan | 5-093555 |
| Mar. 29, 1993 | [JP] | Japan | 5-093558 |
| Mar. 30, 1993 | [JP] | Japan | 5-095609 |
| Mar. 31, 1993 | [JP] | Japan | 5-096861 |

[51] Int. Cl.$^6$ .................................. H04N 7/30
[52] U.S. Cl. .................. 348/407; 348/413; 348/416; 348/699; 386/112
[58] Field of Search .................. 348/407, 413, 348/416, 699, 700; 386/33, 109, 112, 47; H04N 7/30

[56] References Cited

U.S. PATENT DOCUMENTS

| 4,849,812 | 7/1989 | Borgers et al. | 348/400 |
| 5,091,782 | 2/1992 | Krause | 348/407 |
| 5,422,646 | 6/1995 | Herpel | 348/420 |
| 5,434,622 | 7/1995 | Lim | 348/407 |
| 5,561,532 | 10/1996 | Shinji et al. | 386/47 |

*Primary Examiner*—Howard Britton
*Attorney, Agent, or Firm*—Fitzpatrick, Cella, Harper & Scinto

[57] ABSTRACT

A movement detection device includes a first detection unit which detects a high-frequency component of an image signal in units of blocks each consisting of a plurality of pixel data. A second detection unit detects a low-frequency component of the image signal in units of blocks, and a discrimination unit discriminates a movement of the image signal in accordance with outputs from the first and second detection units. Also included is an encoding apparatus having an input unit which inputs image data, and a block forming unit which divides the input image data input into blocks. An orthogonal transform unit orthogonally transforms the image data blocks, and a quantization unit quantizes the orthogonally transformed image data. A detection unit detects the degree of fineness of each image data block, and a control unit performs switching control of a processing method of the orthogonal transform unit in accordance with an output from the detection unit.

20 Claims, 15 Drawing Sheets

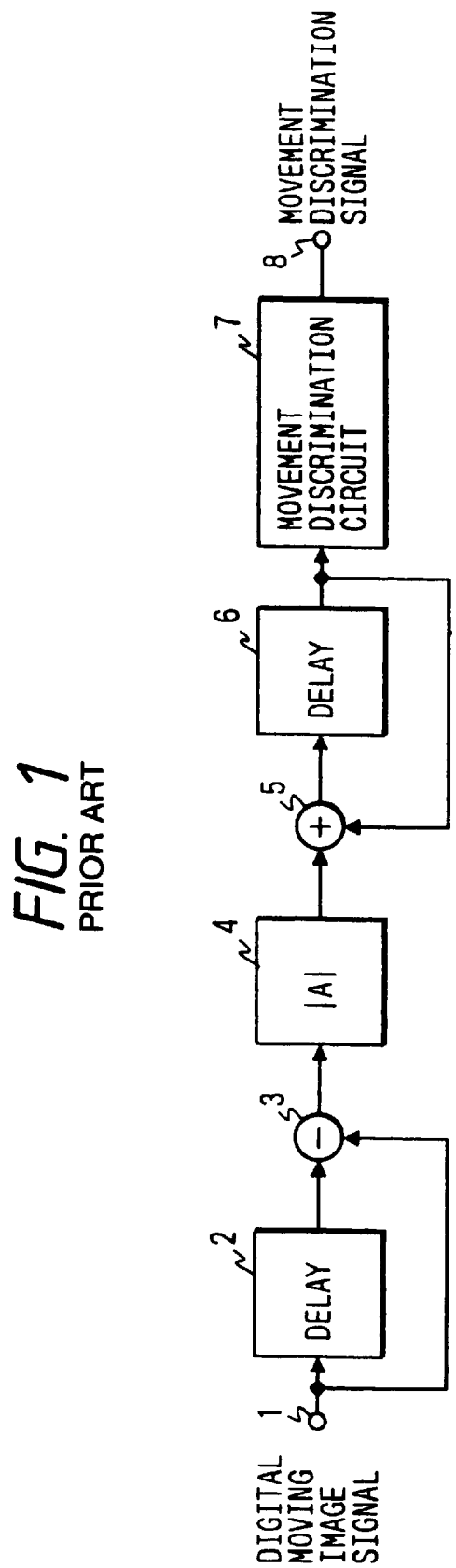

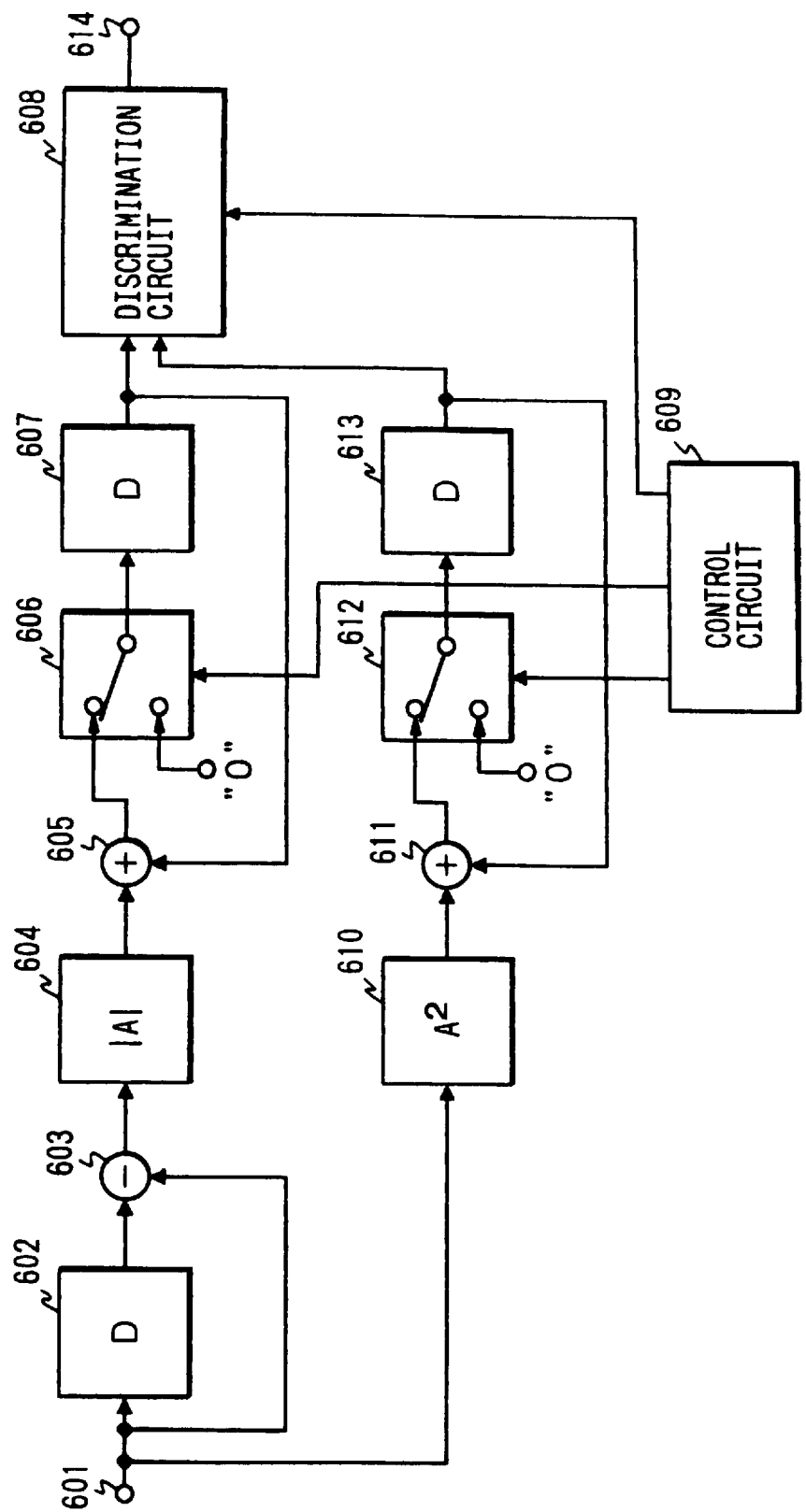

MOVEMENT DETECTION DEVICE AND ENCODING APPARATUS USING THE SAME

This application is a continuation of application Ser. No. 08/779,447 filed Jan. 7, 1997, now abandoned, which is a divisional of application Ser. No. 08/217,281 filed Mar. 24, 1994, now U.S. Pat. No. 5,617,143.

BACKGROUND OF THE INVENTION

1. Field of the Invention

The present invention relates to an encoding apparatus which switches an encoding method by detecting a movement of input image data, and encodes the image data with high efficiency.

2. Related Background Art

In recent years, commercial VTRs have been proposed for encoding an image signal with high efficiency, and recording and reproducing the encoded image signal on/from a medium such as a magnetic tape.

In a VTR of this type, an image signal is divided into blocks each including a predetermined number of pixels, and each image block is subjected to an orthogonal transform such as a discrete cosine transform (to be referred to as DCT hereinafter). The transformed coefficients are quantized, and the quantized value is recorded via entropy encoding.

As a recent image compression method, one using DCT is popular, and movement adaptive processing is performed for improving encoding efficiency upon execution of the DCT.

The movement adaptive processing is performed for the following purpose. Normally, DCT is performed in units of blocks each including 8×8 pixels in a frame. In the case of a moving image, intraframe processing lowers the interfield correlation, and frequency components in the vertical direction are generated, thus decreasing encoding efficiency. For this reason, a movement is detected, and a block including a movement is subjected to a DCT while dividing processing for 8×8 pixels into two fields each including 4×8 pixels, thereby improving encoding efficiency.

In the movement detection method, an interfield difference is calculated, and whether or not a block includes a movement is detected based on the absolute value of the difference.

A movement detection device used in, e.g., a conventional digital VTR is described in detail below.

FIG. 1 is a block diagram of the movement detection device used in, e.g., a conventional digital VTR.

Referring to FIG. 1, a digital moving image signal is input to an input terminal 1 in units of orthogonal transform blocks each consisting of 8 (vertical)×8 (horizontal) pixels. The digital moving image signal is supplied to a delay line 2 having a given delay amount and a subtracter 3. The output from the delay line 2 is supplied to the subtracter 3.

The subtracter 3 calculates the difference value between the current digital moving image signal and that at the same position one field before, and outputs the difference value. The output from the subtracter 3 is supplied to an absolute circuit 4, and the absolute circuit 4 outputs the absolute value of the input difference value. The absolute value is supplied to an adder 5, and the output from the adder 5 is supplied to a delay line 6 having a given delay amount. The output from the delay line 6 is supplied to the adder 5.

The delay amount of the delay line 6 is set to be one sample time, and the adder 5 outputs the sum total of the absolute value outputs (the absolute values of interfield differences). The output from the delay line 6 is supplied to a movement discrimination circuit 7. The movement discrimination circuit 7 discriminates the presence/absence of a movement by comparing the sum total of the absolute values of the difference values with a predetermined threshold value, and outputs a movement discrimination signal from an output terminal 8.

As described above, by utilizing the fact that the movement of an image becomes vertical high-frequency components in a spatial frequency domain, the movement detection device in the conventional digital VTR performs movement discrimination of an image in each block (8×8 pixels) on the basis of the sum total of the absolute values of interfield difference values calculated for a digital moving image signal input in units of orthogonal transform blocks (blocks each including, e.g., 8×8 pixels).

Since the above-mentioned prior art adopts a method of detecting the presence/absence of movement of an image in each block on the basis of the sum total of the absolute values of interfield difference values (difference absolute values between all pairs of pixels in the vertical direction) calculated in units of blocks, if an original image has a fine pattern (e.g., oblique stripes), the sum total of the absolute values of the difference values inevitably becomes large independent of the presence/absence of a movement, and the presence of a movement may be erroneously detected.

For example, a case is examined below wherein the above-mentioned movement detection is performed when data in a pixel block have correlation in units of two lines.

FIGS. 2A to 2C show a block (8×8 pixels) in which data have correlation in units of two lines. In FIGS. 2A to 2C, an open circle indicates a bright pixel, and a full circle indicates a dark pixel.

According to the above-mentioned movement detection method, a strong interfield correlation is detected in FIG. 2A, and a weak interfield correlation is detected in FIG. 2B.

Therefore, in FIG. 2B, intrafield processing (intrafield 4×8 DCT processing) is performed. Upon execution of 4×8 DCT processing for the block shown in FIG. 2B, intrablock data are re-sorted, as shown in FIG. 2C. Therefore, the block shown in FIG. 2B undesirably has a maximum vertical frequency. As described above, when intraframe or intrafield processing is selected based on the above-mentioned movement detection method, coefficients in a high-frequency region upon execution of an orthogonal transform become undesirably high, resulting in low encoding efficiency.

SUMMARY OF THE INVENTION

The present invention has been made in consideration of the above situation, and has as its object to provide a movement detection device which can reliably detect a movement independent of the pattern of input image data (e.g., a movement detection device which never erroneously detects a fine still image as a moving image).

In order to achieve the above object, according to a preferred aspect of the present invention, a movement detection device comprises first detection means for detecting a high-frequency component of an image signal in units of blocks each consisting of a plurality of pixel data, second detection means for detecting a low-frequency component of the image signal in units of blocks, and discrimination means for discriminating a movement of the image signal in accordance with the outputs from the first and second detection means.

It is another object of the present invention to provide an encoding apparatus which can perform high-efficiency encoding independent of the pattern of input image data.

In order to achieve the above object, according to another preferred aspect of the present invention, an encoding apparatus comprises input means for inputting image data, block forming means for dividing image data input by the input means into blocks, orthogonal transform means for performing an orthogonal transform of the image data blocks, quantization means for quantizing the transformed image data, detection means for detecting a degree of fineness of each of the image data blocks, and control means for performing switching control of a processing method of the orthogonal transform means in accordance with an output from the detection means.

Other objects and advantages of the invention will become apparent from the following detailed description taken in conjunction with the appended claims.

BRIEF DESCRIPTION OF THE DRAWINGS

FIG. 1 is a block diagram showing a movement detection device used in a conventional digital VTR or the like;

FIG. 8 is a block diagram showing the second embodiment of the movement detection circuit 106 according to the present invention;

DETAILED DESCRIPTION OF THE PREFERRED EMBODIMENTS

Figure 3:
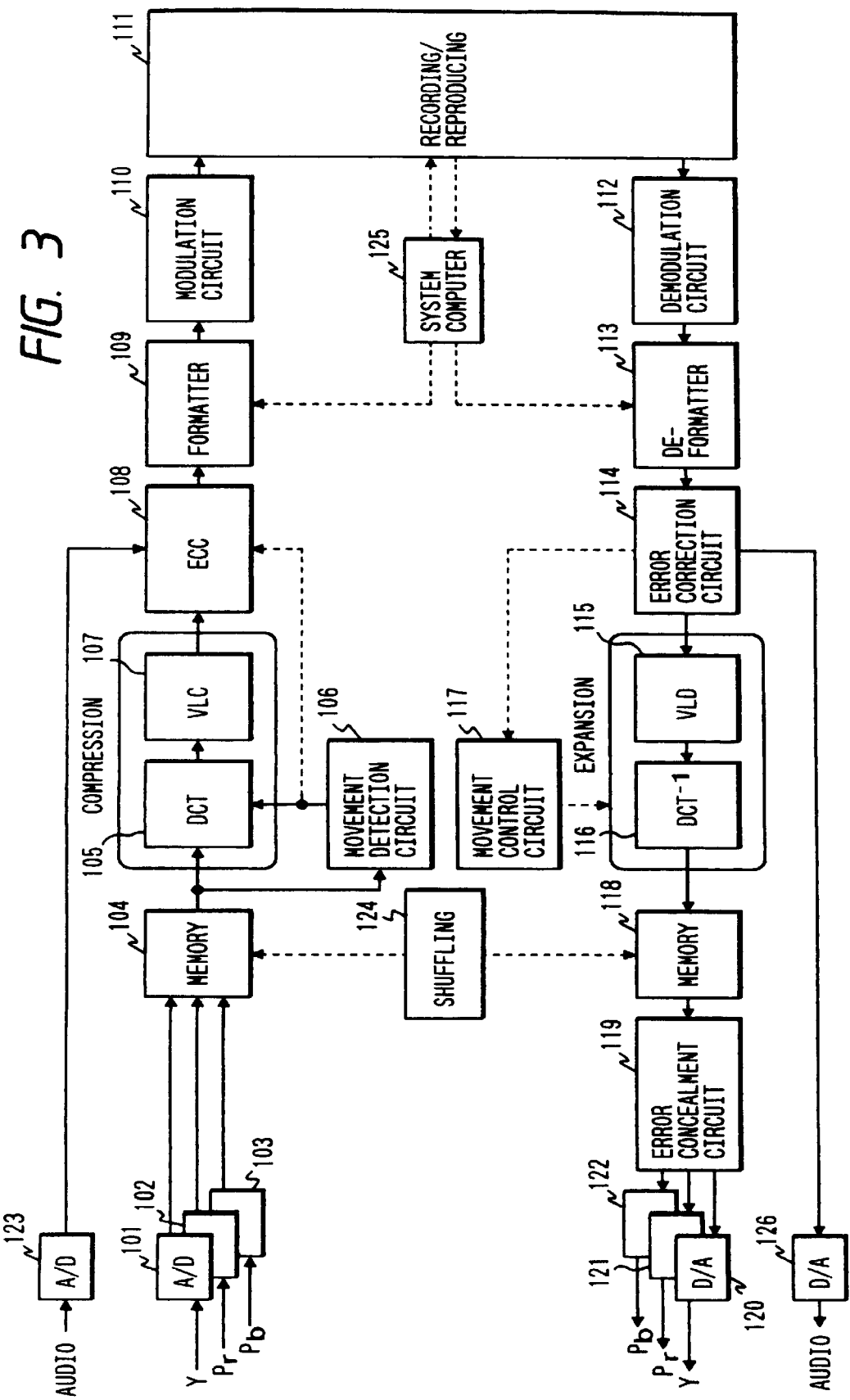
FIG. 3 is a block diagram showing the arrangement of a digital VTR which adopts a movement detection device according to the present invention.

FIG. 3 is a block diagram showing the arrangement of a digital VTR which adopts a movement detection apparatus according to the present invention. Referring to FIG. 3, a video signal to be recorded incudes a luminance signal Y and two color difference signals $P_r$ and $P_b$. These signals are respectively input to A/D converters 101, 102, and 103, and are converted into digital image signals. Also, an audio signal is converted into a digital audio signal by an A/D converter 123. The digital image signals are written in a frame memory 104. When the stored image signals are read out, they are shuffled by a shuffling circuit 124 for the purpose of averaging of data in a fixed-length unit and burst error correction. Thereafter, the readout signals are orthogonally transformed by a DCT (discrete cosine transform) by a DCT circuit 105. The image signals are read out from the memory 104 in units of blocks each including 8 pixels (vertical)×8 pixels (horizontal) as a basic unit of DCT in a frame. Upon execution of DCT of the readout signal blocks, movement adaptive processing for improving encoding efficiency is performed.

Normally, the DCT is performed in units of blocks each including 8×8 pixels in a frame. In the case of a moving image, intraframe processing lowers the interfield correlation, and frequency components in the vertical direction are generated, thus decreasing encoding efficiency. For this reason, a movement detection circuit 106 detects a moving block, and the detected moving block is subjected to the DCT while dividing 8×8 pixel processing into two fields each consisting of 4×8 pixels, thereby improving efficiency. The DCT data of the block subjected to movement processing is quantized by a quantizer (not shown), so that small coefficients generated in a high-frequency region are rounded to zero, thereby decreasing the number of data.

Quantized coefficients are further compressed by a variable length encoding circuit (VLC) 107. The compressed data are supplied to an ECC circuit 108 together with the digital audio signal, and a correction code is added to these signals. Furthermore, the signals output from the ECC circuit 108 are re-sorted in a track format of the VTR by a formatter 109 which is controlled by a system computer 125. Then, the data output from the formatter 109 are digitally modulated by a modulation circuit 110, and the modulated data are recorded on a magnetic tape of a recording/reproducing unit 111 controlled by the system computer 125.

In a reproduction mode, data recorded on the magnetic tape are read out, and the readout modulated data are demodulated into original digital data by a demodulation circuit 112. The demodulated data are deformatted from the track format by a deformatter 113 under the control of the system computer 125. The deformatted data are then supplied to an error correction circuit 114, so that error data generated in a transmission path is corrected to normal data. Of these data, audio data is supplied to a D/A converter 126, and image data are expanded from variable length codes to fixed length codes by a variable length code decoding circuit (VLD) 115. Thereafter, these data are subjected to inverse quantization and an inverse DCT in an inverse DCT circuit 116.

At this time, a moving block is processed based on movement information sent together with the image data. That is, a block with a small movement (still image) is subjected to an inverse DCT by 8×8 pixel processing in a frame under the control of a movement control circuit 117; a block with a large movement (moving image) is subjected to an inverse DCT by intrafield processing using two 4×8 pixel fields. Thereafter, the transformed data are written in a memory 118. The data are read out from the memory 118 in the order of raster scanning while deshuffling them by deshuffling processing.

As for data which cannot be corrected by the error correction circuit 114, a flag is supplied to an error concealment circuit 119 to interpolate an error block using data of surrounding pixels or the previous frame. Thereafter, the data are converted from digital data into analog data by D/A converters 120, 121, and 122, and the converted data are output as component signals.

The movement detection circuit 106 (see FIG. 3) used upon execution of the DCT is described hereinafter.

The first embodiment of the movement detection circuit 106 is described below.

Figure 4:
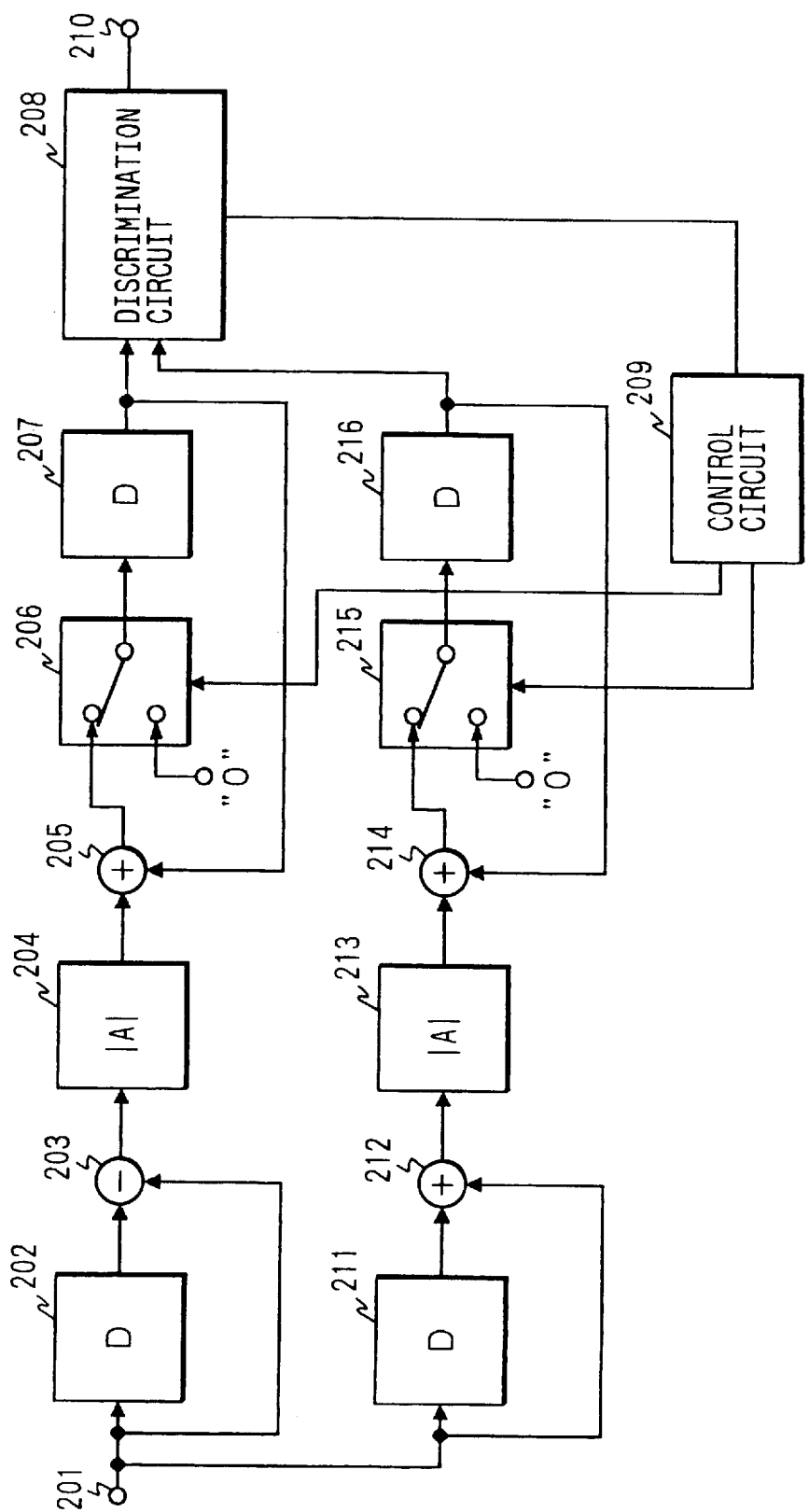
FIG. 4 is a block diagram showing the first embodiment of a movement detection circuit 106 according to the present invention.

FIG. 4 is a block diagram showing the first embodiment of the movement detection circuit 106 according to the present invention. Referring to FIG. 4, the movement detection circuit 106 comprises an input terminal 201 for receiving image data read out from the frame memory 104, a D-latch 202, a subtraction circuit 203, an absolute circuit 204, an addition circuit 205, a selector 206, a D-latch 207, a discrimination circuit 208, a control circuit 209, an output terminal 210, a D-latch 211, an addition circuit 212, an absolute circuit 213, an addition circuit 214, a selector 215, and a D-latch 216.

The operation of the movement detection circuit 106 with the above arrangement is described below.

Figure 5:
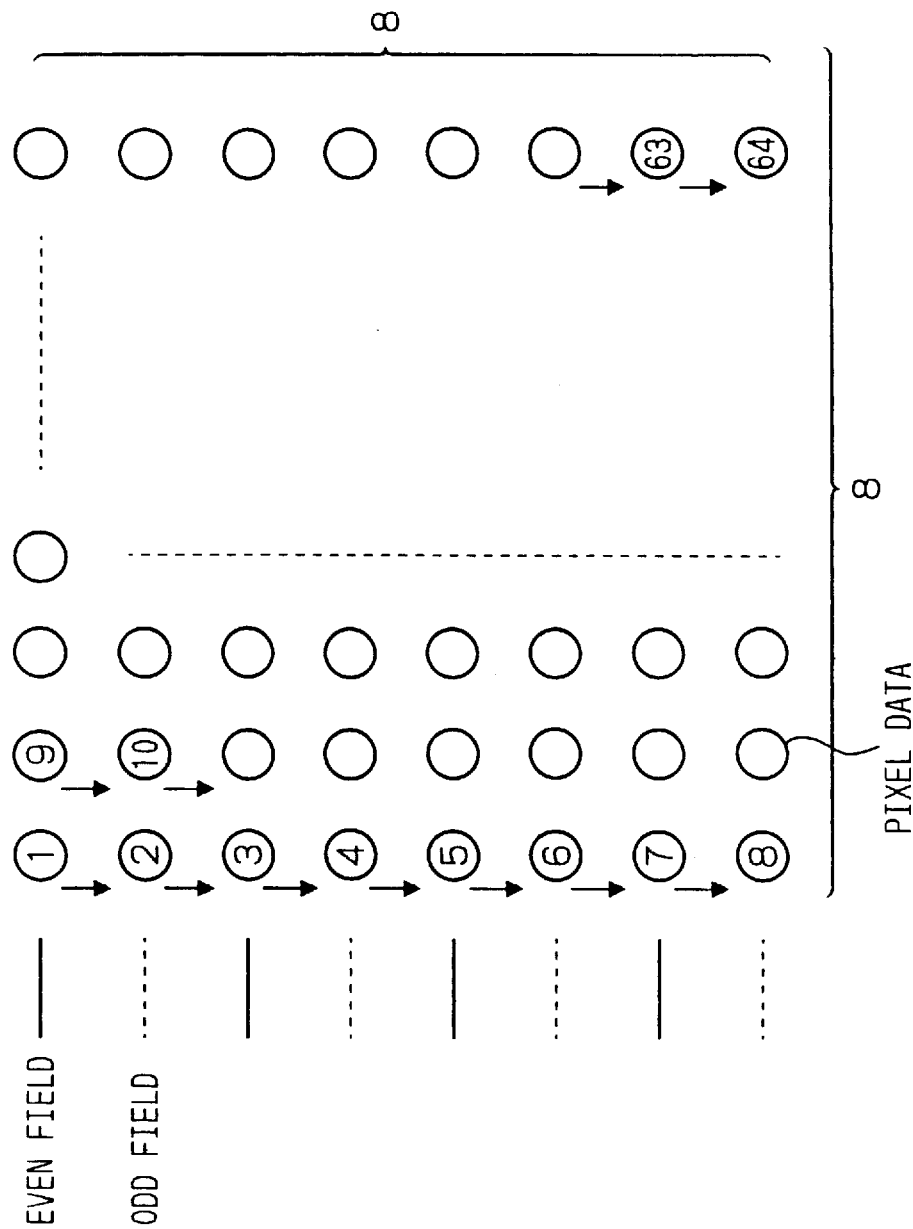
FIG. 5 is a view showing the order of (8×8) pixel block data read out from a frame memory 104.

Pixel data read out from the frame memory 104 (FIG. 3) in an order of numbers as shown in FIG. 5 are input from the input terminal 201, and the D-latch 202 delays input data by one data and outputs the delayed data. The subtraction circuit 203 calculates the difference between pixel data delayed by one data, and the current pixel data, and outputs a vertical high-frequency component. The high-frequency component is input to the absolute circuit 204, and its absolute value is calculated. The addition circuit 205 receives the current high-frequency component data, and data delayed by one data by the D-latch 207 via the selector 206, and calculates the sum total of the vertical high-frequency components in one DCT block. Note that the addition circuit 205, the selector 206, and the D-latch 207 constitute an accumulator. The selector 206 selects a value "0" for each DCT block under the control of the control circuit 209, thereby resetting the accumulation result.

On the other hand, the D-latch 211 and the addition circuit 212 constitute a low-pass filter for detecting a vertical low-frequency component. The output from the addition circuit 212 is input to the absolute circuit 213, and its absolute value is calculated. The addition circuit 214, the selector 215, and the D-latch 216 constitute an accumulation circuit. The sum total of the absolute values is calculated by the accumulation circuit, and is input to the discrimination circuit 208 in units of blocks.

The discrimination circuit 208 outputs "1" when it determines a large movement by a method to be described later; the circuit 208 outputs "0" when it determines a small movement. The signal "1" or "0" is output from the output terminal 210. The DCT mode (8×8 or 4×8) is switched in accordance with the output "1" or "0".

Figure 6:
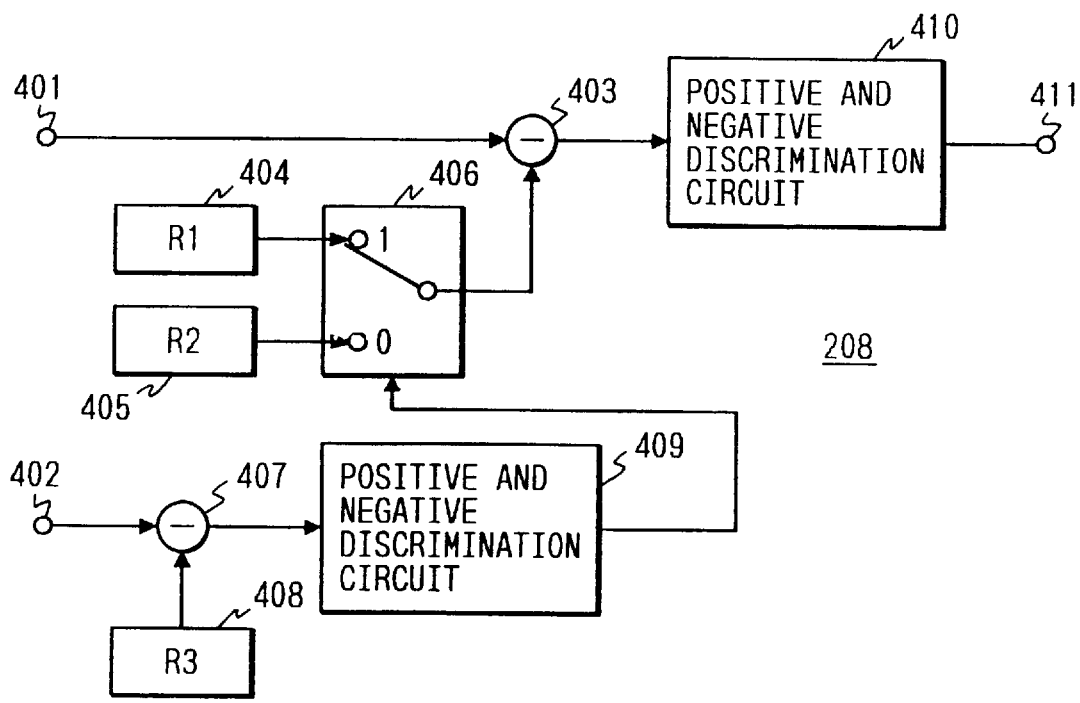
FIG. 6 is a block diagram showing the internal arrangement of the first embodiment of a discrimination circuit 208.

FIG. 6 is a block diagram showing the internal arrangement of the discrimination circuit 208 according to the first embodiment.

Referring to FIG. 6, the discrimination circuit 208 comprises an input terminal 401 for receiving data from the D-latch 207 (FIG. 4), i.e., receiving a vertical high-frequency component of an image in a block, an input terminal 402 for receiving data from the D-latch 216 (FIG. 4), i.e., receiving a vertical low-frequency component of an image in a block, subtraction circuits 403 and 407, registers 404, 405, and 408 for respectively setting numerical value data R1, R2, and R3, a selector 406, positive and negative discrimination circuits 409 and 410 for outputting a code "1" when input data is positive and "0" and for generating a code "0" when input data is negative, and an output terminal 411.

The operation of the discrimination circuit 208 with the above arrangement will be described below.

The input terminal 401 may receive a value ranging from zero to a maximum value "14280" as a high-frequency component of an 8-bit pixel in a block. Also, the input terminal 402 may receive a value ranging from zero to a maximum value "28560" as a low-frequency component.

Assume that a value R1=7140 is set in the register 404, and a value R2=3570 is set in the register 405. Also, assume that a value R3=14280 is set in the register 408.

When the low-frequency component input to the input terminal 402 exceeds 14280, the output from the subtraction circuit 407 becomes positive, and the output from the positive and negative discrimination circuit 409 becomes "1". Thus, the selector 406 selects the value R1=7140 of the register 404. In this state, if the vertical high-frequency component of an image input to the input terminal 401 is equal to or larger than 7140, the value of the subtraction circuit 403 becomes positive, and the positive and negative discrimination circuit 410 outputs "1" to the output terminal 411. On the other hand, if the value of the input terminal 401 is smaller than 7140, the value of the subtraction circuit 403 becomes negative, and the positive and negative discrimination circuit 410 outputs "0" to the output terminal 411.

On the other hand, when a value equal to or smaller than 14280 is input to the input terminal 402, the output from the subtraction circuit 407 becomes negative, and hence, the selector 406 selects the value R2=3570 of the register 405. In this state, if the input value of the input terminal 401 is equal to or larger than 3570, "1" is output to the output terminal 411; when the input value is smaller than 3570, "0" is output to the output terminal 411.

Figure 7:
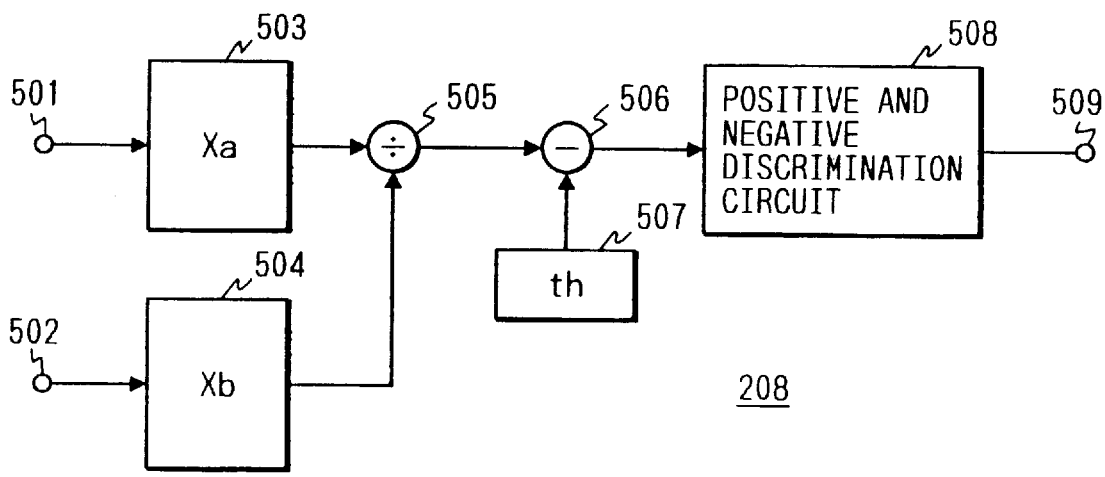
FIG. 7 is a block diagram showing the internal arrangement of the second embodiment of a discrimination circuit 208.

FIG. 7 is a block diagram showing the internal arrangement of the discrimination circuit 208 according to the second embodiment.

Referring to FIG. 7, the discrimination circuit 208 comprises an input terminal 501 for receiving a vertical high-frequency component in a block, an input terminal 502 for receiving a vertical low-frequency component in a block, coefficient circuits 503 and 504, a division circuit 505, a subtraction circuit 506, a register 507, a positive and negative discrimination circuit 508, and an output terminal 509.

In the above-mentioned arrangement, high-frequency component data input to the input terminal 501 is multiplied with a coefficient a by the coefficient circuit 503. On the other hand, low-frequency component data input to the input terminal 502 is multiplied with a coefficient b by the coefficient circuit 504. These two data are input to the division circuit 505 to calculate a ratio between the two values. The difference between the value of the calculated ratio and a predetermined threshold value th set in the register 507 is calculated by the subtraction circuit 506. If the difference is positive, the positive and negative discrimination circuit 508 outputs "1"; if the difference is negative, the circuit 508 outputs "0". The output from the circuit 508 is output from the output terminal 509.

In the above description, the division circuit 505 calculates the ratio between the vertical high- and low-frequency components of an image, and when the ratio is larger than the threshold value, it is determined that the input image is a still image; when the ratio is smaller than the threshold value, it is determined that the input image is a moving image.

As described above, upon discrimination of an interfield correlation or movement by detecting a vertical high-frequency component in a block, since the discrimination reference value is changed in accordance with the value of a vertical low-frequency component in the block, erroneous detection for a still image having a relatively fine pattern can be prevented, and DCT adaptive control can be precisely executed. Therefore, compression efficiency can be improved, and encoding with high image quality can be realized.

The second embodiment of the movement detection circuit 106 is described below.

FIG. 8 is a block diagram showing the second embodiment of the movement detection circuit 106 according to the present invention. Referring to FIG. 8, the movement detection circuit 106 comprises an input terminal 601 for receiving image data read out from the frame memory 104 (FIG. 3), a D-latch 602 for delaying input data by one field, a subtraction circuit 603, an absolute circuit 604, an addition circuit 605, a selector 606, a D-latch 607, a discrimination circuit 608, a control circuit 609, a square circuit 610 comprising, e.g., a multiplier, an addition circuit 611, a selector 612, a D-latch 613, and an output terminal 614 for outputting a movement discrimination result.

The operation of the movement detection circuit 106 with the above arrangement is described below.

Pixel data read out from the frame memory 104 (FIG. 3) in the order of numbers shown in FIG. 5 are input from the input terminal 601. The D-latch 602 delays input data by one data, and outputs delayed data. The subtraction circuit 603 calculates pixel data delayed by one data, and the current pixel data, and outputs a vertical high-frequency component. The high-frequency component is input to the absolute circuit 604, and its absolute value is calculated. The addition circuit 605 receives the current high-frequency component data, and data delayed by one data by the D-latch 607 via the selector 606, and calculates the sum total of vertical high-frequency components in one DCT block. Note that the addition circuit 605, the selector 606, and the D-latch 607 constitute an accumulator. The selector 606 selects a value "0" for each DCT block under the control of the control circuit 609, thereby resetting the accumulation result.

The square circuit 610 calculates a square of input pixel data. Then, a square sum in one DCT block is calculated by an accumulator constituted by the addition circuit 611, the selector 612, and the D-latch 613 as in the above-mentioned accumulator. The discrimination circuit 608 receives the sum of the vertical high-frequency components in a block, and the square sum, and performs movement discrimination based on these data. The circuit 608 then outputs the discrimination result to the output terminal 614.

The discrimination circuit 608 outputs "1" when it determines a large movement by a method to be described later; the circuit 608 outputs "0" when it determines a small movement. The signal "1" or "0" is output from the output terminal 614. The DCT mode (8×8 or 4×8) is switched in accordance with the output "1" or "0".

Since the detailed arrangement of the discrimination circuit 608 is the same as that shown in FIG. 6, a detailed description thereof is omitted. The operation of the discrimination circuit 608 with the arrangement shown in FIG. 6 is described below.

Assume that a value R1=7168 is set in the register 404, a value R2=3548 is set in the register 405, and a value R3 half of maximum power is set in the register 408. When an input image has a fine pattern, and is equal to or larger than the setting value R3, the output from the subtraction circuit 407 becomes positive, and the positive and negative discrimination circuit 409 outputs "1". Thus, the selector 406 selects the setting value R1. When a vertical high-frequency component of an image is input to the input terminal 401, and its value is equal to or larger than the setting value R1=7168, the output from the subtraction circuit 403 becomes positive, and the positive and negative discrimination circuit 410 outputs "1". When the value at the input terminal 401 is smaller than 7168, a value "0" is output to the output terminal 411.

On the other hand, when an image has a relatively coarse (flat) pattern, the input at the input terminal 402 has a small value (a value smaller than the value R3 of the register 408). As a result, the selector 406 selects the setting value R2 of the register 405 to lower a threshold value for the vertical high-frequency component input value of an image at the input terminal 401, and movement discrimination is performed using this threshold value.

Figure 9A:
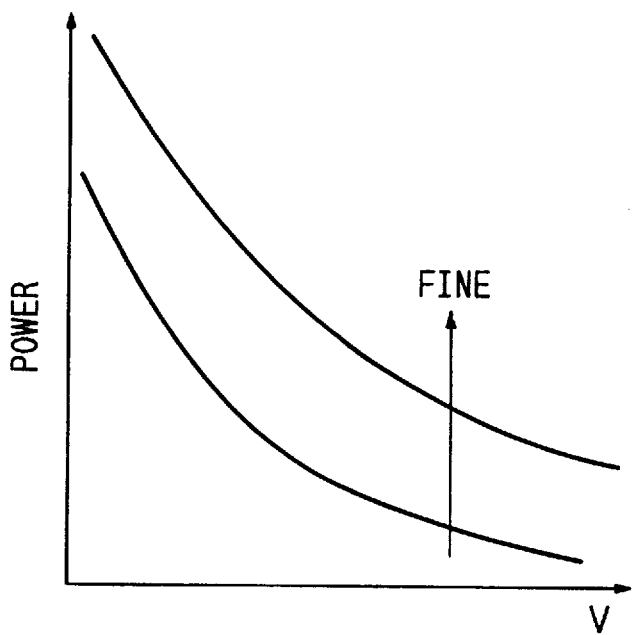
FIGS. 9A and 9B are graphs for explaining the discrimination method of a discrimination circuit 608.
Figure 9B:
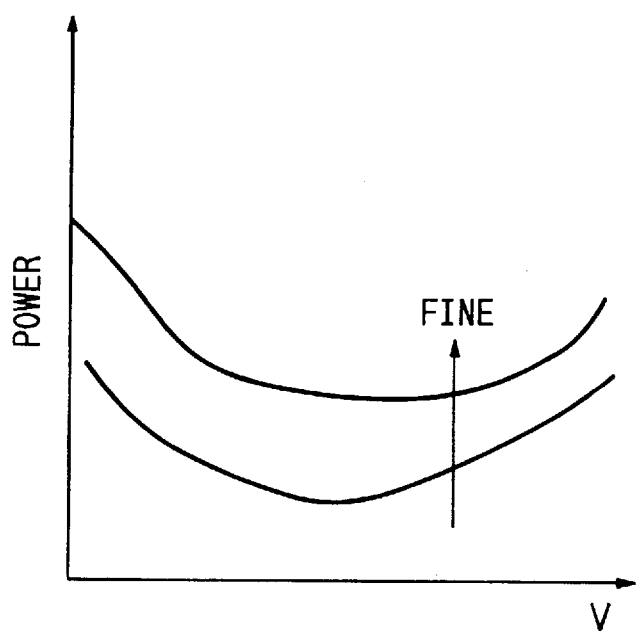

The above-mentioned operation is explained below with reference to FIGS. 9A and 9B. In FIGS. 9A and 9B, the vertical frequency component in a block of an image is plotted along the abscissa, and its power density is plotted along the ordinate. FIG. 9A shows the vertical distribution in the case of a still image, and FIG. 9B shows the distribution in the case of a moving image.

FIG. 9A shows the distributions of a relatively fine pattern and a coarse pattern in the case of a still image. In the case of the fine pattern, the entire power tends to be large although its distribution pattern is similar to that of the coarse pattern. On the other hand, in the case of a moving image shown in FIG. 9B, a fine pattern also has large power, and a coarse pattern has small power although the low-frequency components are smaller than that in the still image. Therefore, when movement discrimination is performed based on high-frequency components, the threshold value of the discrimination must be varied depending on the magnitude of the power.

Figure 10:
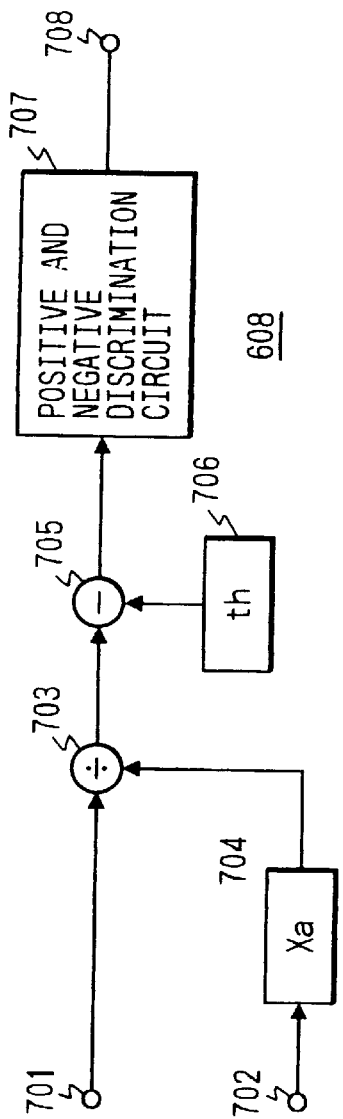
FIG. 10 is a block diagram showing another arrangement of the discrimination circuit 608.

FIG. 10 is a block diagram showing another arrangement of the discrimination circuit 608 shown in FIG. 8. Referring to FIG. 10, the discrimination circuit 608 comprises an input terminal 701 for receiving a vertical high-frequency component of an image, an input terminal 702 for receiving power in a block of an image, a division circuit 703, a coefficient circuit 704, a subtraction circuit 705, a register 706, a positive and negative discrimination circuit 707, and an output terminal 708 of the discrimination circuit.

The operation of the discrimination circuit 608 is described below.

The input terminal 701 receives a vertical high-frequency component, and the input terminal 7C2 receives power in a block. The value of the input power is multiplied with a coefficient a by the coefficient circuit 704 to have a proper value. Since the division circuit 703 divides the vertical high-frequency component with the value obtained by multiplying the power with the coefficient, it outputs a value obtained by normalizing the vertical high-frequency component with the power. More specifically, when the power is large, it acts to decrease the high-frequency component.

Therefore, discrimination of a moving image (an image with a large movement) and a still image (an image with a small movement) is discriminated using a constant threshold value of the register 706 independent of whether an image has a fine pattern or a coarse (flat) pattern.

As described above, since movement discrimination is performed by comparing the frequency component and power in an image block, a block which corresponds to a fine pattern of an image and has no movement is prevented from being erroneously discriminated as a moving block. Therefore, adaptive encoding efficiency of an image is improved, and image compression with high image quality is realized.

The third embodiment of the movement detection circuit 106 is described below.

Figure 11:
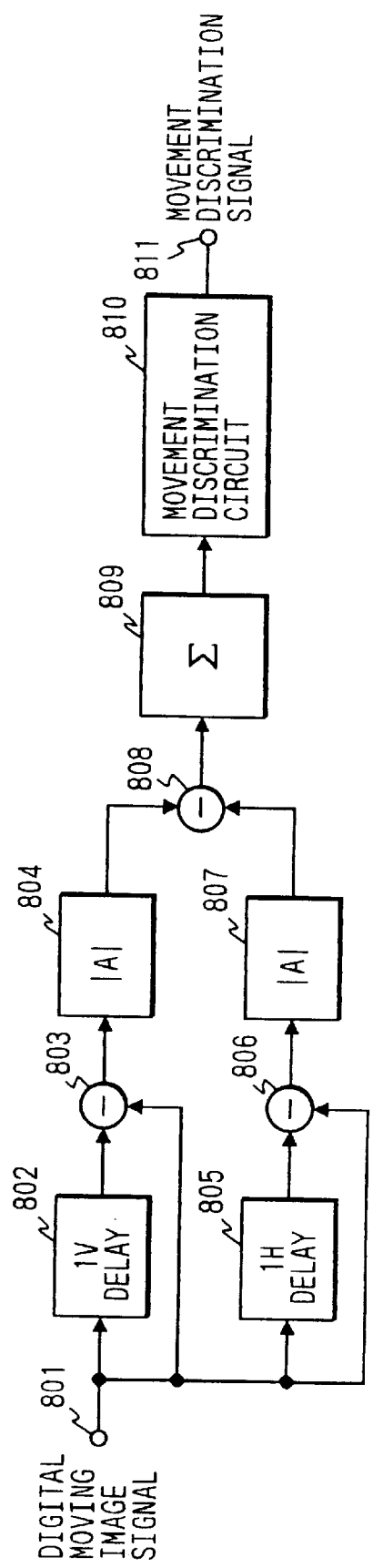
FIG. 11 is a block diagram showing the third embodiment of the movement detection circuit 106 according to the present invention.

FIG. 11 is a block diagram showing the third embodiment of the movement detection circuit 106 according to the present invention.

Referring to FIG. 11, an input terminal 801 receives a digital moving image signal in units of orthogonal transform blocks, and the input signal is supplied to a delay line 802 having a delay amount corresponding to one field scanning period, a delay line 805 having a delay amount corresponding to one horizontal line scanning period, and subtracters 803 and 806. The subtracter 803 outputs the difference between the current digital moving image signal and a digital moving image signal one field before, i.e., an interfield difference value. The output from the subtracter 803 is supplied to an absolute circuit 804, and the absolute circuit 804 outputs the absolute value of the interfield difference value.

On the other hand, the output from the delay line 805 is supplied to the subtracter 806. The subtracter 806 outputs the difference between the current digital moving image signal and a digital moving image signal one line before, i.e., an interline difference value. The output from the subtracter 806 is supplied to an absolute circuit 807, and the absolute circuit 807 outputs the absolute value of the interline difference value.

The outputs from the absolute circuits 804 and 807 are supplied to a subtracter 808, and the subtracter 808 outputs the difference value between the absolute value of the interfield difference value and the absolute value of the interline difference value. The output from the subtracter 808 is supplied to a summation circuit 809, and the summation circuit 809 sequentially adds the difference values between the absolute values of the interfield difference values and the absolute values of the interline difference values and outputs the sum total. The output from the summation circuit 809 is supplied to a movement discrimination circuit 810, and the movement discrimination circuit 810 compares the sum total of the difference values between the absolute values of the interfield difference values and the absolute values of the interline difference values with a threshold value. Thus, the circuit 810 discriminates the presence/absence of movement of a moving image signal present in a region divided in units of blocks, and outputs a movement discrimination signal from an output terminal 811.

Figure 12:
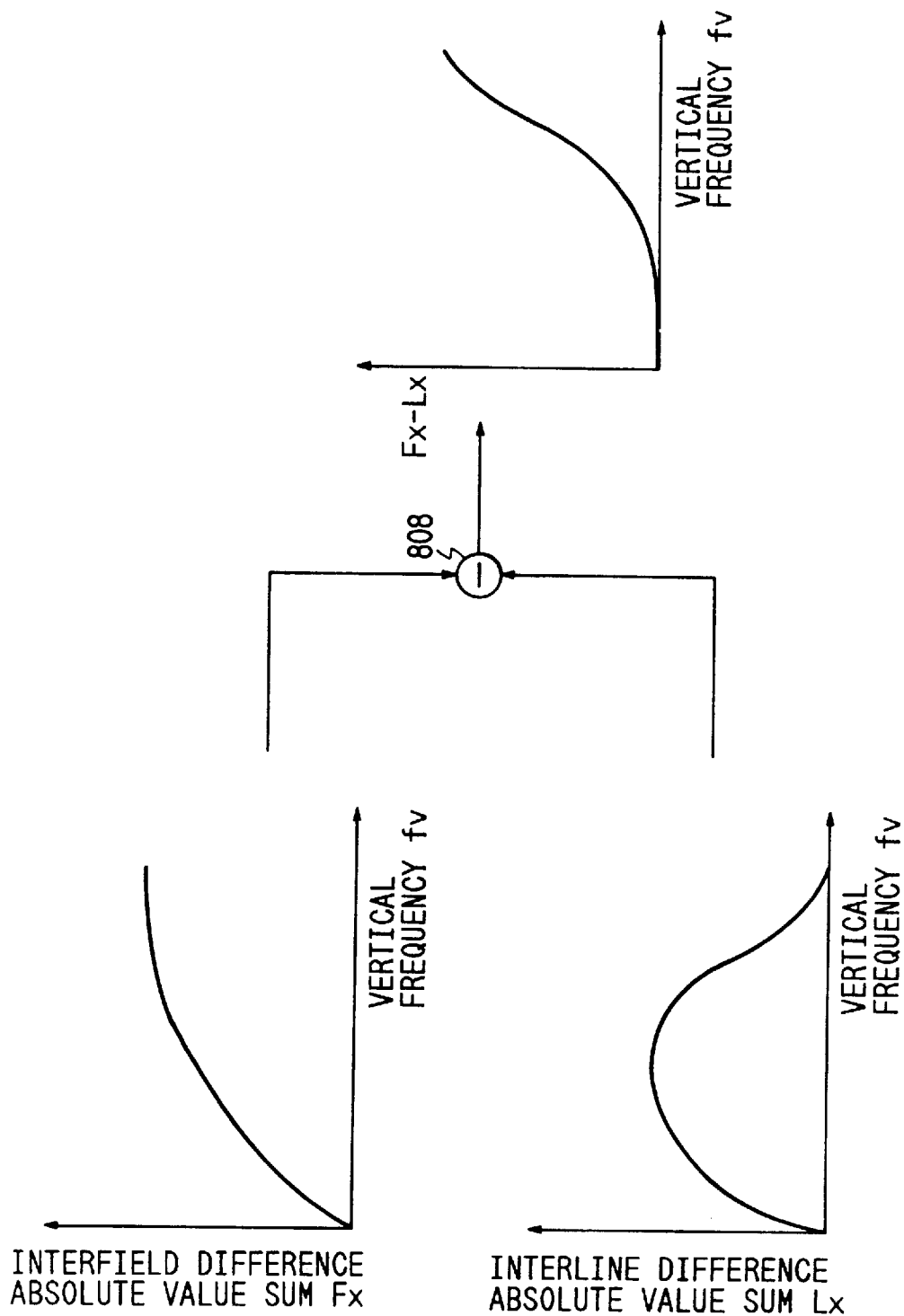
FIG. 12 is a graph showing a spatial frequency discrimination process.

As shown in FIG. 12, a sum total $F_x$ of the absolute values of the interfield difference values has a large value in proportion to vertical frequency components included in an image signal. On the other hand, a sum total $L_x$ of the absolute values of the interline difference values has a small value when the vertical frequency components included in the image signal are distributed on the low- or high-frequency side. Therefore, the output level of the summation circuit 809 in FIG. 11 has a positive correlation with the vertical high-frequency components in the image signal, and the movement of an image (an interfield change in image signal), which appears as high-frequency components in a spatial frequency domain, are detected.

The fourth embodiment of the movement detection circuit 106 is described below.

Figure 13:
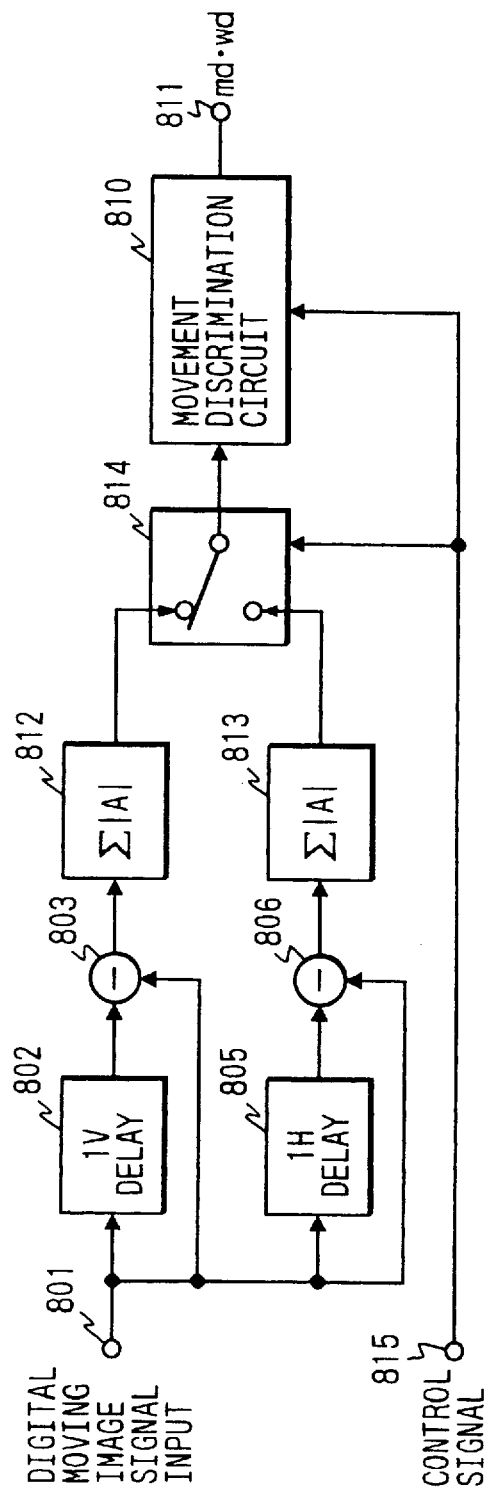
FIG. 13 is a block diagram showing the fourth embodiment of the movement detection circuit 106 according to the present invention.

FIG. 13 is a block diagram showing the fourth embodiment of the movement detection circuit 106 according to the present invention. Note that the same reference numerals in FIG. 13 denote the same or equivalent parts as in FIG. 11, and a detailed description thereof is omitted.

Referring to FIG. 13, the output from the subtracter 803 is supplied to an absolute value summation circuit 812, and the absolute value summation circuit 812 outputs a sum total of the absolute values of the interfield difference values. On the other hand, the output from the subtracter 806 is supplied to an absolute value summation circuit 813, and the absolute value summation circuit 813 outputs a sum total of the absolute values of the interline difference values.

The outputs from the absolute value summation circuits 812 and 813 are supplied to a switch 814. The switch 814 is controlled by a control signal input from, e.g., an external control microcomputer (CPU; not shown) via a control signal input terminal 815, and selects and outputs one of the sum total of the absolute values of the interfield difference values and the sum total of the absolute values of the interline difference values.

The output from the switch 814 is supplied to the movement discrimination circuit 810. The movement discrimination circuit 810 is synchronized with the switch 814 by the control signal, and discriminates the degree of fineness of a pattern and the presence/absence of movement of the digital moving image signal input from the input terminal 801 on the basis of the sum total of the absolute values of the interfield difference value and the sum total of the absolute values of the interline difference values, which sum totals are independently input. Also, the movement discrimination circuit 810 determines a weighting coefficient using a spatial frequency as a parameter with respect to the input digital moving image signal, and outputs a movement discrimination signal md and a weighting coefficient wd from the output terminal 811.

The weighting coefficient wd is described below. The weighting coefficient wd is utilized upon execution of a DCT of image data. More specifically, image data is subjected to a DCT, and the transformed DCT coefficients are multiplied with the weighting coefficient wd ($0 < wd \leq 1$), thereby reducing data.

Note that the weighting coefficient wd varies depending on the frequency. For example, in the case of a fine image, the weighting coefficient is determined to reduce DCT coefficients at the high-frequency side.

As described above, according to the third and fourth embodiments, since movement discrimination of the image signal is performed on the basis of the sum total of the interfield difference values and the interline difference values or the sum total of the interfield difference values and the sum total of the interline difference values, only vertical high-frequency components corresponding to a movement included in the image signal are selectively detected, and a probability of movement erroneous detection for a still image having an oblique stripe pattern or an image with a small movement is decreased as compared to a case wherein movement detection is performed based on only the interfield difference values as in the prior art, thus improving precision of movement discrimination. For example, as in the fourth embodiment, when circuits for obtaining the interfield difference values and the interline difference values are independently arranged, selection precision of the weighting coefficient for code amount control upon compression and encoding of a digital moving image signal (means that deterioration is not visually conspicuous) is improved.

The fifth embodiment of the movement detection circuit 106 is described below.

Figure 14:
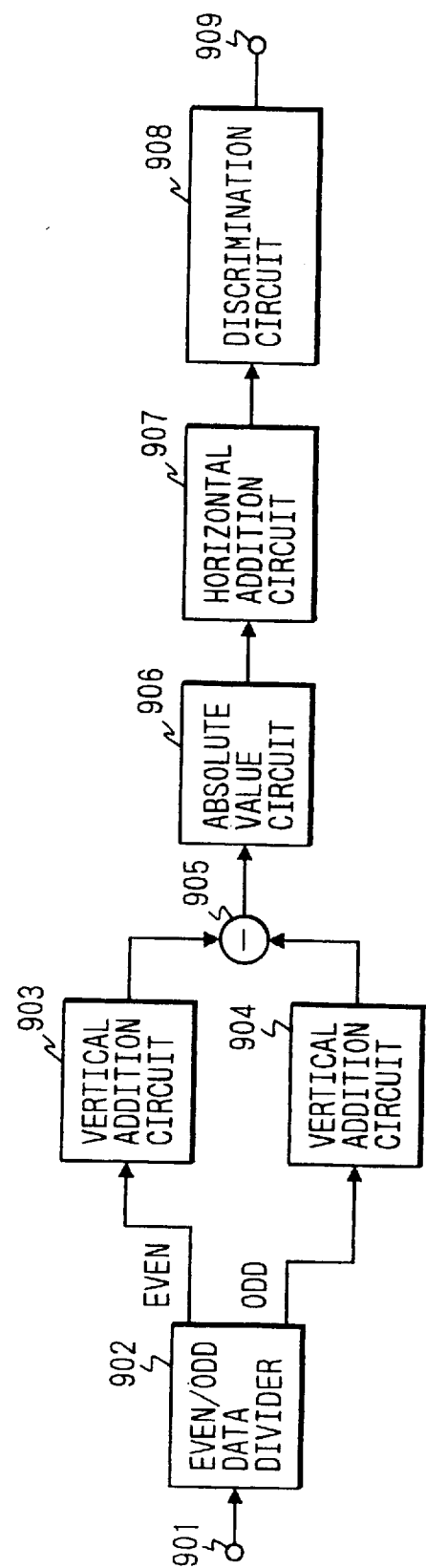
FIG. 14 is a block diagram showing the fifth embodiment of the movement detection circuit 106 according to the present invention.

FIG. 14 is a block diagram showing the fifth embodiment of the movement detection circuit 106 according to the present invention.

Referring to FIG. 14, the movement detection circuit 106 comprises an input terminal 901 for receiving image data read out from the frame memory 104 (FIG. 3) in units of (8×8) pixel blocks, an even/odd data divider 902 for dividing intrablock data into even field data and odd field data, vertical addition circuits 903 and 904, a subtracter 905, an absolute circuit 906, a horizontal addition circuit 907, a discrimination circuit 908, and an output terminal 909.

The operation of the movement detection circuit 106 with the above arrangement is described below.

Pixel data read out from the frame memory 104 (FIG. 3) in units of (8×8) pixel blocks are input from the input terminal 901. The input image data is divided into even and odd data by the even/odd data divider 902.

The even image data is supplied to the vertical addition circuit 903, and four pixel data in the vertical direction are added to each other. Similarly, the odd image data is supplied to the vertical addition circuit 904, and four pixel data in the vertical direction are added to each other. The outputs from the vertical addition circuits 903 and 904 are supplied to the subtracter 905, and the difference value between the even data sum and the odd data sum is calculated. Then, the absolute circuit 906 calculates the absolute value of the output from the subtracter 905. The horizontal addition circuit 907 adds the output from the absolute circuit 906 in the horizontal direction in a block, thus calculating a sum total of all the absolute values in the block. The discrimination circuit 908 compares the output from the circuit 907 with a predetermined threshold value, thereby discriminating the magnitude of a high-frequency orthogonal transform coefficient in the block.

The above-mentioned calculation is described in detail below with reference to the accompanying drawings.

Figure 15:
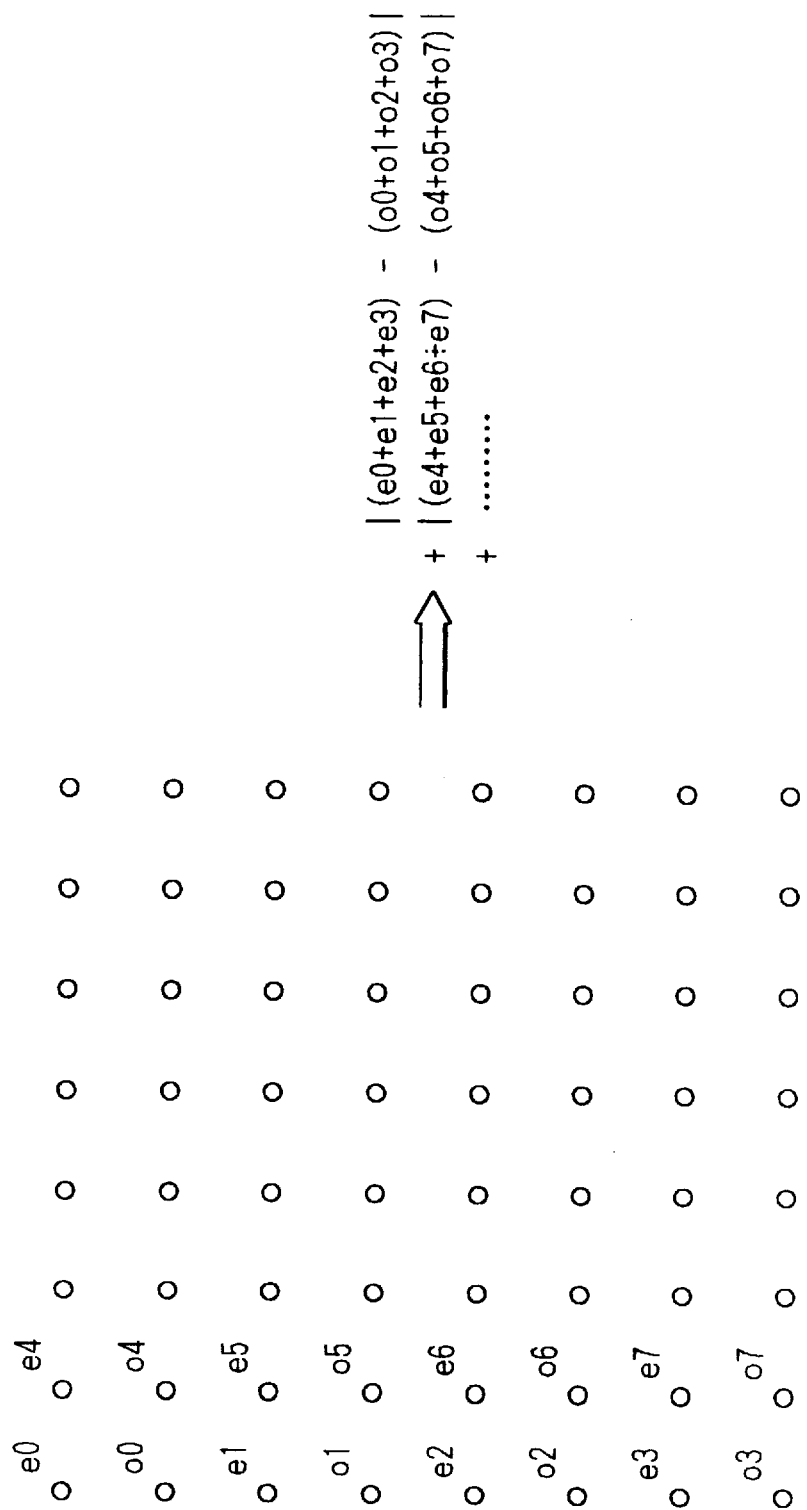
FIG. 15 is a view for explaining a movement discrimination calculation in an (8×8) pixel block according to the fifth embodiment.

FIG. 15 is a view for explaining the movement discrimination calculation of the fifth embodiment in an (8×8) pixel block.

Figure 2C:
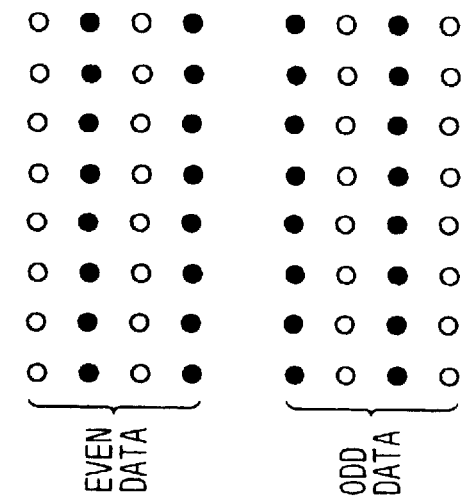
FIGS. 2A to 2C are views showing a block (8×8 pixels) in which data have correlation in units of two lines.
Figure 2B:
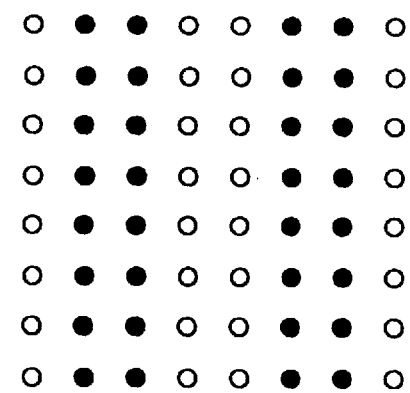
Figure 2A:
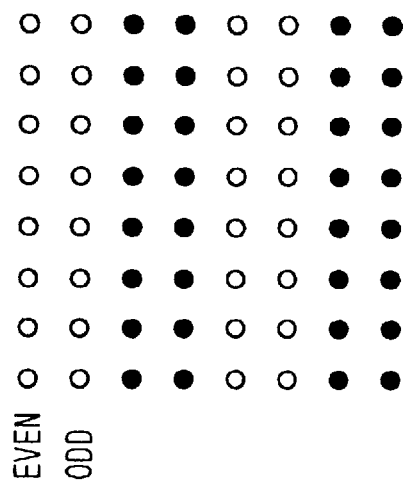

As shown in FIG. 15, if even data of pixel data in a block (64 pixels) are represented by e0, e1, ..., e32, and odd data are represented by o0, o1, ..., o32, the absolute value of the difference value between e0+ ... +e3 and then, the difference value between e4+ ... +e7 and o4+ ... +o7 is calculated. Subsequently, the absolute value of the difference value between e8+ ... +e11 and o8+ ... +o11, the absolute value of the difference value between e12+ ... +e15 and o12+ ... +o15, and the like are similarly calculated. Thereafter, these absolute values are added to each other, and the sum is output from the horizontal addition circuit 907. The discrimination circuit 908 discriminates the magnitude of the high-frequency orthogonal transform coefficient based on the sum. In this manner, the same movement discrimination result is obtained from the blocks shown in FIGS. 2A and 2B, and orthogonal transform suitable for a movement is executed.

Figure 16:
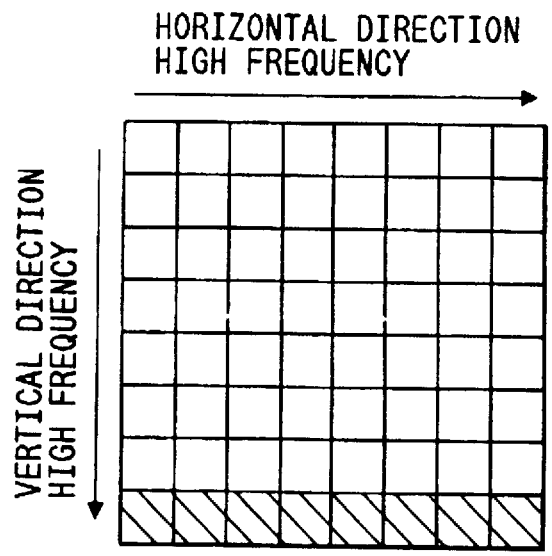
FIG. 16 is a view for explaining orthogonal transform coefficients used in movement discrimination of the fifth embodiment.

FIG. 16 is a view for explaining orthogonal transform coefficients used in movement discrimination of the fifth embodiment.

When the fifth embodiment is used, the output from the discrimination circuit 908 indicates an approximation of the coefficients of the vertical high-frequency components of the orthogonal transform coefficients (8×8), i.e., the strength of the hatched portion in FIG. 16.

When the discrimination circuit 908 in the fifth embodiment discriminates that a high-frequency orthogonal transform coefficient is small, the DCT circuit 105 is controlled to perform a DCT in units of (8×8) pixel blocks. On the other hand, when the discrimination circuit 908 in the fifth embodiment discriminates that a high-frequency orthogonal transform coefficient is large, the DCT circuit 105 is controlled to perform a DCT while dividing (8×8) pixel block processing into two (4×8) pixel blocks in a field.

The sixth embodiment of the movement detection circuit 106 is described below.

Figure 17:
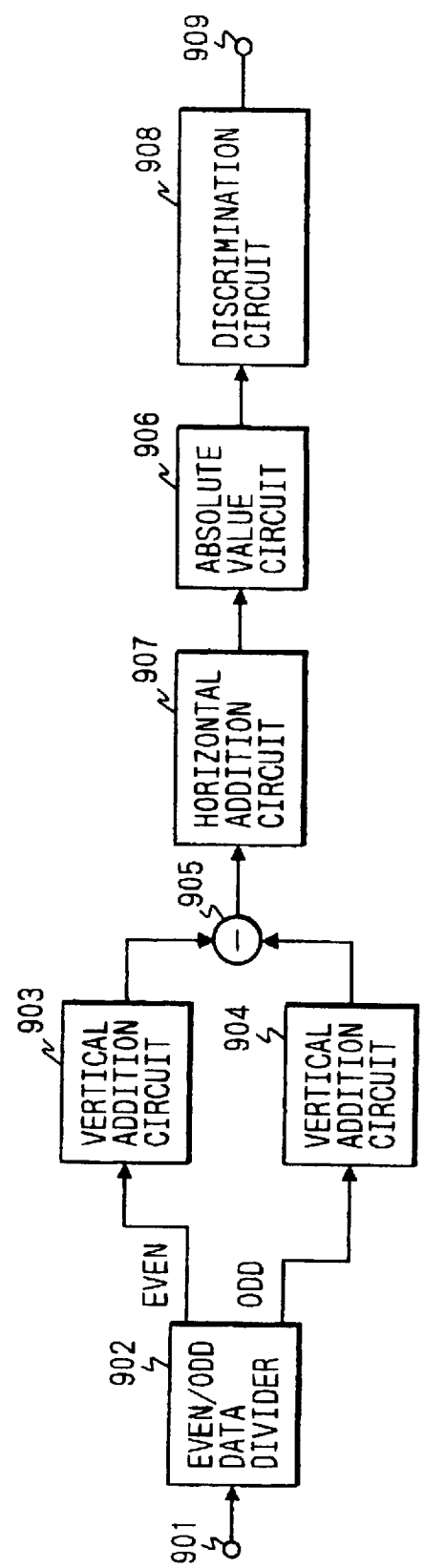
FIG. 17 is a block diagram showing the sixth embodiment of the movement detection circuit 106 according to the present invention.

FIG. 17 is a block diagram showing the sixth embodiment of the movement detection circuit 106 according to the present invention. The same reference numerals in FIG. 17 denote the corresponding parts in FIG. 14.

A difference between the arrangement shown in FIG. 17 and that of the fifth embodiment is that the horizontal addition circuit 907 is connected to the output of the subtracter 905, the output from the horizontal addition circuit 907 is supplied to the absolute circuit 906, and the output from the absolute circuit 906 is supplied to the discrimination circuit 908.

The operation of the movement detection circuit 106 with the above arrangement is described below.

Pixel data read out from the frame memory 104 (FIG. 3) in units of (8×8) pixel blocks are input from the input terminal 901. The input image data is divided into even and odd data by the even/odd data divider 902. The even image data is supplied to the vertical addition circuit 903, and four pixel data in the vertical direction are added to each other. Similarly, the odd image data is supplied to the vertical addition circuit 904, and four pixel data in the vertical direction are added to each other. The outputs from the vertical addition circuits 903 and 904 are supplied to the subtracter 905, and the difference value between the even data sum and the odd data sum is calculated. The output from the subtracter 905 is supplied to the horizontal addition circuit 907, and data in an image processing block are added in the horizontal direction. The output from the horizontal addition circuit 907 is supplied to the absolute circuit 906, and its absolute value is calculated. The absolute value is compared with a threshold value by the discrimination circuit 908, thus discriminating the magnitude of a DC component of the high-frequency orthogonal transform coefficient in a block.

Figure 18:
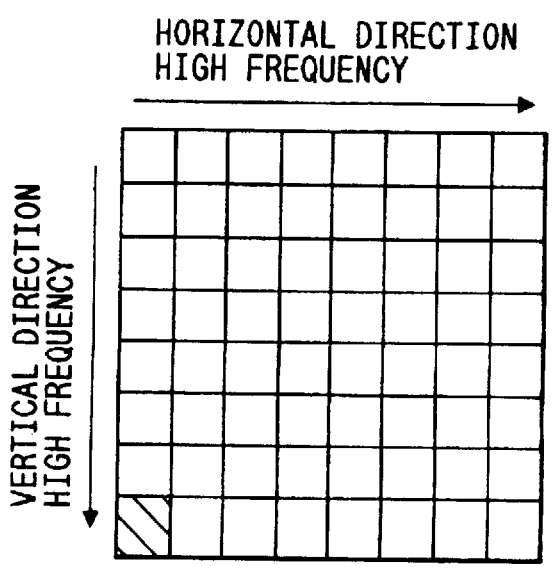
FIG. 18 is a view for explaining orthogonal transform coefficients used in movement discrimination of the sixth embodiment.

FIG. 18 is a view for explaining orthogonal transform coefficients used in movement discrimination of the sixth embodiment.

When the sixth embodiment is used, the output from the discrimination circuit 908 indicates an approximation of the horizontal DC coefficient of the vertical high-frequency components of orthogonal transform coefficients (8×8), i.e., the strength of the hatched portion in FIG. 18.

When the discrimination circuit 908 in the sixth embodiment discriminates that the DC component of the high-frequency orthogonal transform coefficient is small, the DCT circuit 105 (FIG. 3) is controlled to perform DCT in units of (8×8) pixel blocks. On the other hand, when the discrimination circuit 908 in the sixth embodiment discriminates that the DC component of a high-frequency orthogonal transform coefficient is large, the DCT circuit 105 is controlled to perform DCT while dividing (8×8) pixel block processing into two (4×8) pixel blocks in a field.

As another method of a method of performing switching control of DCT while dividing image data into even and odd data according to the fifth and sixth embodiment, an average value of eight pixels in the horizontal direction may be used to calculate an average value of even data in the vertical direction by addition and an average value of odd data in the vertical direction by subtraction, and the absolute values of these calculation results may be discriminated.

As described above, according to the fifth and sixth embodiments, since a correlation between even and odd fields in a block is discriminated based on a plurality of data, in the vertical direction, in each field, the frequency in a block is prevented from being increased upon execution of an orthogonal transform. Similarly, since an intraframe or intrafield orthogonal transform is performed based on the approximate value of actual intraframe orthogonal transform high-frequency coefficients, orthogonal transform which can suppress high-order orthogonal transform coefficients are selected, and encoding efficiency is improved.

Various other changes and modifications of the invention may be made without departing from the spirit or scope of the invention.

In other words, the foregoing description of embodiments has been given for illustrative purposes only and not to be construed as imposing any limitation in every respect.

The scope of the invention is, therefore, to be determined solely by the following claims and is not limited by the text of the specifications and alterations made within a scope equivalent to the scope of the claims fall within the true spirit and scope of the invention.

What is claimed is:

1. A movement detection device comprising:
   a) input means for inputting an image signal in units of blocks each consisting of a plurality of pixel data;
   b) calculation means for calculating an absolute value of a difference between a plurality of even field pixel data and a plurality of odd field pixel data of the block input by said input means, wherein the plurality of even field pixel data and the plurality of odd field pixel data do not include all of the pixel data of the block; and
   c) discrimination means for discriminating movement of the block input by said input means, according to an output of said calculation means, according to an output of said calculation means.

2. A device according to claim 1, wherein said calculation means calculates the value of difference on the unit basis of pixel data arranged in a column of the block.

3. A device according to claim 1, further comprising:
   orthogonal transform means for orthogonally transforming the image signal; and
   encoding means for encoding the orthogonally transformed image signal,
   wherein a transform method of said orthogonal transform means is selected in accordance with an output from said discrimination means.

4. A device according to claim 3, wherein said orthogonal transform means performs a DCT.

5. A device according to claim 4, wherein the transform method of said orthogonal transform means is selected between a frame transform mode and a field transform mode.

6. A device according to claim 5, further comprising:
   recording means for recording the image signal encoded by said encoding means on a recording medium.

7. An encoding apparatus comprising:
   a) input means for inputting image data;
   b) block forming means for dividing the image data input by said input means into blocks;
   c) orthogonal transform means for orthogonally transforming the image data blocks, said orthogonal transform means having a frame transform mode and a field transform mode;
   d) quantization means for quantizing the orthogonally transformed image data;
   e) encoding means for encoding the quantized image data;
   f) calculation means for calculating an absolute value of a difference between a plurality of even field pixel data and a plurality of odd field pixel data of each of the image data blocks, wherein the plurality of even field pixel data and the plurality of odd field pixel data do not include all of the pixel data of the block; and
   g) selecting means for selecting a transform mode of said orthogonal transform means according to an output of said calculation means.

8. An apparatus according to claim 7, further comprising:
   recording means for recording on a recording medium the image data encoded by said encoding means.

9. A movement detection method comprising the steps of:
   a) inputting an image signal in units of blocks each consisting of a plurality of pixel data;
   b) calculation an absolute value of a difference between a plurality of even field pixel data and a plurality of odd filed pixel data of the block input by said input step, wherein the plurality of even field pixel data and the plurality of odd field pixel data do not include all of pixel data of the block; and
   c) discriminating movement of the block input by said input step, according to a calculation result in said calculation step.

10. An encoding method comprising the steps of:
    a) inputting image data;
    b) dividing the image data input by said input step into blocks;
    c) orthogonally transforming the image data blocks, said orthogonal transform step having a frame transform mode and a field transform mode;
    d) quantizing the orthogonally transformed image data;
    e) encoding the quantized image data;
    f) calculating an absolute value of a difference between a plurality of even field pixel data and a plurality of odd field pixel data of each of the image data blocks, wherein the plurality of even field pixel data and the plurality of odd field pixel data do not include all of the pixel data of the block; and
    g) selecting a transform mode of said orthogonal transform step according to a calculation result of said calculation step.

11. An image processing apparatus comprising:
    a) input means for inputting an image signal in units of blocks each consisting of a plurality of pixel data;
    b) calculation means for dividing a block in a vertical direction and calculating an absolute value of a difference between even field pixel data and odd field pixel data for every divided area of the block; and c) discrimination means for discriminating movement of the block input by said input means, according to an output of said calculation means.

12. An apparatus according to claim 11, further comprising:

orthogonal transform means for orthogonally transforming the image signal; and encoding means for encoding the orthogonally transformed image signal, wherein a transform method of said orthogonal transform means is selected in accordance with an output of said discrimination means.

13. An apparatus according to claim 12, wherein the transform method of said orthogonal transform means is selected between a frame transform mode and a field transform mode.

14. An apparatus according to claim 13, further comprising:

recording means for recording the image signal encoded by said encoding means on a recording medium.

15. An apparatus according to claim 14, wherein said orthogonal transform means performs a DCT.

16. An image processing method comprising the steps of:

a) inputting an image signal in units of blocks each consisting of a plurality of pixel data;

b) dividing a block in a vertical direction and calculating an absolute value of a difference between even field pixel data and odd field pixel data for every divided area of the block; and c) discrimination means for discriminating movement of the blocks input by said input steps, according to a calculation result in said calculation step.

17. An image processing apparatus comprising:

a) input means for inputting an image signal in units of blocks each consisting of m pixel data;

b) calculation means for calculating an absolute value of a difference between n even filed pixel data and n odd field pixel data of the block input by said input means ($2 \leq n < m$); and c) discrimination means for discriminating movement of the block input by said input means, according to an output of said calculation means.

18. An apparatus according to claim 17, further comprising:

orthogonal transform means for orthogonally transforming the image signal; and encoding means for encoding the orthogonally transformed image signal, wherein a transform method of said orthogonal transform means is selected in accordance with an output of said discrimination means.

19. An apparatus according to claim 18, wherein the transform method of said orthogonal transform means is selected a frame transform mode and a field transform mode.

20. An image processing method comprising the steps of:

a) inputting an image signal in units of blocks each consisting of m pixel data;

b) calculating an absolute value of a difference between n even field pixel data and n odd field pixel data of the block input by said input step ($2 \leq n < m$); and c) discriminating movement of the block input by said input means, according to an output of said calculation means.

* * * * *

UNITED STATES PATENT AND TRADEMARK OFFICE
CERTIFICATE OF CORRECTION

PATENT NO. : 5,874,996

DATED : February 23, 1999

INVENTOR(S) : Shimokoriyama et al.

It is certified that error appears in the above-identified patent and that said Letters Patent is hereby corrected as shown below:

Column, 13 line 49-50, delete ", according to an output of said calculation means"

Signed and Sealed this

Twenty-seventh Day of April, 1999

Attest:

Attesting Officer

Q. TODD DICKINSON

Acting Commissioner of Patents and Trademarks